(12) United States Patent
Shepelev et al.

(10) Patent No.: US 9,946,423 B2
(45) Date of Patent: *Apr. 17, 2018

(54) CAPACITIVE SENSING DURING NON-DISPLAY UPDATE TIMES

(71) Applicant: SYNAPTICS INCORPORATED, San Jose, CA (US)

(72) Inventors: Petr Shepelev, Campbell, CA (US); Adam Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,880

(22) Filed: Jan. 9, 2017

(65) Prior Publication Data

US 2017/0115779 A1    Apr. 27, 2017

Related U.S. Application Data

(63) Continuation of application No. 14/641,040, filed on Mar. 6, 2015, now Pat. No. 9,576,558, which is a (Continued)

(51) Int. Cl.
*G06F 3/044* (2006.01)
*G06F 3/041* (2006.01)
*G09G 5/18* (2006.01)

(52) U.S. Cl.
CPC ............ *G06F 3/044* (2013.01); *G06F 3/0412* (2013.01); *G06F 3/0416* (2013.01); *G09G 5/18* (2013.01)

(58) Field of Classification Search
CPC ...... G06F 3/044; G06F 3/0448; G06F 3/0412; G09G 2310/04
See application file for complete search history.

(56) References Cited

U.S. PATENT DOCUMENTS 5,093,655 A    3/1992    Tanioka et al.
5,392,058 A    2/1995    Tagawa
(Continued)

FOREIGN PATENT DOCUMENTS

CN    1716018 A    1/2006
CN    101051256 A    10/2007
(Continued)

OTHER PUBLICATIONS

PCT international search report and written opinion of PCT/US2012/054005 dated Jan. 3, 2013.
(Continued)

*Primary Examiner* — Benjamin C Lee
*Assistant Examiner* — Robert Michaud
(74) *Attorney, Agent, or Firm* — Patterson + Sheridan, LLP

(57) ABSTRACT

Embodiments of the invention generally provide an input device with display screens that periodically update (refresh) the screen by selectively driving common electrodes corresponding to pixels in a display line. In general, the input devices drive each electrode until each display line (and each pixel) of a display frame is updated. In addition to updating the display, the input device may perform capacitive sensing using the display screen as a proximity sensing area. To do this, the input device may interleave periods of capacitive sensing between periods of updating the display based on a display frame. For example, the input device may update the first half of display lines of the display screen, pause display updating, perform capacitive sensing, and finish updating the rest of the display lines. Further still, the input device may use common electrodes for both updating the display and performing capacitive sensing.

20 Claims, 8 Drawing Sheets

Related U.S. Application Data continuation of application No. 13/606,354, filed on Sep. 7, 2012, now Pat. No. 9,007,336.

(60) Provisional application No. 61/532,042, filed on Sep. 7, 2011.

(56) References Cited

U.S. PATENT DOCUMENTS

| | | | |
|---|---|---|---|
| 5,534,892 | A | 7/1996 | Tagawa |
| 5,896,120 | A | 4/1999 | Iguchi et al. |
| 6,219,113 | B1 | 4/2001 | Takahara |
| 6,239,788 | B1 | 5/2001 | Nohno et al. |
| 6,560,276 | B1 | 5/2003 | Long et al. |
| 7,031,886 | B1 | 4/2006 | Hargreaves |
| 7,633,566 | B2 | 12/2009 | Utsunomiya et al. |
| 8,154,533 | B2 | 4/2012 | Jung et al. |
| 2004/0095336 | A1 | 5/2004 | Hong et al. |
| 2004/0217945 | A1 | 11/2004 | Miyamoto et al. |
| 2005/0135492 | A1 | 6/2005 | Jia et al. |
| 2006/0012575 | A1 | 1/2006 | Knapp et al. |
| 2006/0114247 | A1 | 6/2006 | Brown |
| 2007/0026966 | A1 | 2/2007 | Sanchez |
| 2007/0074914 | A1 | 4/2007 | Geaghan et al. |
| 2007/0262966 | A1 | 11/2007 | Nishimura et al. |
| 2008/0018581 | A1 | 1/2008 | Park et al. |
| 2008/0048989 | A1 | 2/2008 | Yoon et al. |
| 2008/0055267 | A1 | 3/2008 | Wu et al. |
| 2008/0062139 | A1 | 3/2008 | Hotelling et al. |
| 2008/0062140 | A1 | 3/2008 | Hotelling et al. |
| 2008/0062147 | A1 | 3/2008 | Hotelling et al. |
| 2008/0062148 | A1 | 3/2008 | Hotelling et al. |
| 2008/0104655 | A1 | 5/2008 | Hayward |
| 2008/0144743 | A1 | 6/2008 | Alderson et al. |
| 2008/0150901 | A1 | 6/2008 | Lowles et al. |
| 2008/0180407 | A1 | 7/2008 | Utsunomiya et al. |
| 2008/0309625 | A1 | 12/2008 | Krah et al. |
| 2008/0309627 | A1* | 12/2008 | Hotelling .......... G02F 1/134363 345/173 |
| 2008/0309628 | A1 | 12/2008 | Krah et al. |
| 2009/0009194 | A1 | 1/2009 | Seguine |
| 2009/0046205 | A1 | 2/2009 | Strasser et al. |
| 2009/0079707 | A1 | 3/2009 | Kaehler et al. |
| 2009/0160461 | A1 | 6/2009 | Zangl et al. |
| 2009/0195511 | A1 | 8/2009 | Cites et al. |
| 2009/0256818 | A1 | 10/2009 | Noguchi et al. |
| 2010/0001973 | A1 | 1/2010 | Hotelling et al. |
| 2010/0019780 | A1 | 1/2010 | Bulea |
| 2010/0045635 | A1 | 2/2010 | Soo |
| 2010/0053380 | A1 | 3/2010 | Ise |
| 2010/0060591 | A1 | 3/2010 | Yousefpor et al. |
| 2010/0066692 | A1 | 3/2010 | Noguchi et al. |
| 2010/0085324 | A1 | 4/2010 | Noguchi et al. |
| 2010/0110040 | A1 | 5/2010 | Kim et al. |
| 2010/0182273 | A1 | 7/2010 | Noguchi et al. |
| 2010/0193257 | A1 | 8/2010 | Hotelling et al. |
| 2010/0194695 | A1 | 8/2010 | Hotelling et al. |
| 2010/0194696 | A1 | 8/2010 | Chang et al. |
| 2010/0194697 | A1 | 8/2010 | Hotelling et al. |
| 2010/0194698 | A1 | 8/2010 | Hotelling et al. |
| 2010/0214262 | A1 | 8/2010 | Ishizaki et al. |
| 2010/0225612 | A1 | 9/2010 | Ishizaki et al. |
| 2010/0265210 | A1 | 10/2010 | Nakanishi et al. |
| 2010/0289765 | A1 | 11/2010 | Noguchi et al. |
| 2010/0295804 | A1 | 11/2010 | Takeuchi et al. |
| 2010/0295824 | A1 | 11/2010 | Noguchi et al. |
| 2010/0302202 | A1 | 12/2010 | Takeuchi et al. |
| 2010/0309162 | A1 | 12/2010 | Nakanishi et al. |
| 2010/0328239 | A1 | 12/2010 | Harada et al. |
| 2010/0328255 | A1 | 12/2010 | Ishizaki et al. |
| 2010/0328256 | A1 | 12/2010 | Harada et al. |
| 2010/0328257 | A1 | 12/2010 | Noguchi et al. |
| 2010/0328259 | A1 | 12/2010 | Ishizaki et al. |
| 2010/0328274 | A1 | 12/2010 | Noguchi et al. |
| 2010/0328291 | A1 | 12/2010 | Ishizaki et al. |
| 2011/0042152 | A1 | 2/2011 | Wu |
| 2011/0050585 | A1 | 3/2011 | Hotelling et al. |
| 2011/0102361 | A1 | 5/2011 | Philipp |
| 2011/0210939 | A1* | 9/2011 | Reynolds .......... G06F 3/0418 345/174 |
| 2011/0210940 | A1 | 9/2011 | Reynolds |
| 2011/0210941 | A1 | 9/2011 | Reynolds et al. |
| 2011/0267305 | A1 | 11/2011 | Shahparnia et al. |
| 2012/0056835 | A1 | 3/2012 | Choo et al. |
| 2012/0102191 | A1 | 4/2012 | Rabii |

FOREIGN PATENT DOCUMENTS

| | | |
|---|---|---|
| CN | 1940842 B | 5/2010 |
| CN | 102124426 A | 7/2011 |
| EP | 1936479 A1 | 6/2008 |
| EP | 1892605 A3 | 7/2008 |
| EP | 2330493 A2 | 6/2011 |
| EP | 2343631 A1 | 7/2011 |
| JP | 2006106853 A | 4/2006 |
| JP | 2007-065508 A | 3/2007 |
| JP | 2007334606 A | 12/2007 |
| JP | 2008015755 A | 1/2008 |
| JP | 2008090623 A | 4/2008 |
| JP | 2010072581 A | 4/2010 |
| JP | 2010277443 A | 12/2010 |
| TW | 200945147 A | 11/2009 |
| WO | WO-0127868 A1 | 4/2001 |
| WO | WO-03019346 A1 | 3/2003 |
| WO | WO-2004045905 A2 | 6/2004 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |
| WO | WO-2011035489 A1 | 3/2011 |

OTHER PUBLICATIONS

European Patent Office, Supplementary European Search Report, Application No. 12829359.4-1507 / 2754017, PCT/US2012054005, pp. 1-9, dated Jun. 2, 2015.

Japanese Patent Application No. P2014-529868, Office Action dated Nov. 24, 2015, 9 pages.

China Office Action English Translation for Application No. 201280054263.X, dated Apr. 5, 2016, consisits of 24 pages.

China Office Action English Translation for Application No. 201610601640.7, dated Apr. 25, 2017, consists of 28 pages including English translation.

China Office Action and Search Report, English Translation for Application No. 201510386171.7, dated Jun. 20, 2017, consisits of 16 pages including English translation.

China Office Action English Translation for Application No. 201510387213.9, dated Aug. 15, 2017, consists of 21 pages including English translation.

\* cited by examiner

CAPACITIVE SENSING DURING NON-DISPLAY UPDATE TIMES

CROSS-REFERENCE TO RELATED APPLICATIONS

This application is a continuation of patent application Ser. No. 14/641,040, filed Mar. 6, 2015, which is a continuation of patent application Ser. No. 13/606,354, filed Sep. 7, 2012 now U.S. Pat. No. 9,007,336, which claims benefit of U.S. provisional patent application Ser. No. 61/532,042, filed Sep. 7, 2011 entitled "CAPACITIVE SENSING DURING NON-DISPLAY UPDATE TIMES," which are herein incorporated by reference in their entireties. This application is related to U.S. patent application Ser. No. 13/606,547 filed on the same day as this application entitled "DISTRIBUTED BLANKING FOR TOUCH OPTIMIZATION" with inventors Jeffrey Lillie, John Childs, Christopher Ludden, Thomas Mackin, and Petr Shepelev, which is herein incorporated by reference.

BACKGROUND OF THE INVENTION

Field of the Invention

Embodiments of the present invention generally relate to performing capacitance sensing while updating a display, or more specifically, to performing capacitance sensing when display updating is paused.

Description of Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

Embodiments of the invention generally provide a processing system for a display device comprising an integrated capacitive sensing device. The processing system includes a driver module comprising driver circuitry where the driver module coupled to a plurality of common electrodes configured to be driven for updating a plurality of display lines in a display screen of the display device and performing capacitive sensing. The driver module is configured to drive a first one of the common electrodes for updating a first one of the display lines during a first time period of a first display frame and drive a second one of the common electrodes for updating a second one of the display lines during a second time period of the first display frame. The driver module is further configured to drive a first transmitter electrode for capacitive sensing during a third time period of the first display frame where the first transmitter electrode comprises at least one of the plurality of common electrodes. Moreover, the third time period is at least as long as the first time period and occurs after the first time period and before the second time period. The processing system also includes a receiver module coupled to a plurality of receiver electrodes and configured to receive resulting signals while driving the first transmitter electrode during the third time period. The processing system includes a determination module configured to determine positional information for an input object based on the resulting signals.

Embodiments of the invention generally provide a method for operating a display device comprising an integrated capacitive sensing device. The method includes driving a first common electrode of a plurality of common electrodes for updating, during a first time period, a first display line of a first display frame and driving a second common electrode of the plurality of common electrodes for updating, during a second time period, a second display line of the first display frame. The method includes driving first transmitter electrode for capacitive sensing during a third time period of the first display frame. The first transmitter electrode comprises at least one of the plurality of common electrodes, and the third time period is at least as long as the first time period and occurs after the first time period and before the second time period. The method includes receiving resulting signals on a plurality of receiver electrodes while driving the first transmitter electrode during the third time period and determining positional information for an input object based on the resulting signals.

Embodiments of the invention may further provide a display device having an integrated capacitive sensing device. The display device includes a plurality of common electrodes configured to be driven for updating a plurality of display lines of a display screen of the display device and performing capacitive sensing and a plurality of receiver electrodes. The display device includes a processor coupled to the plurality of common electrodes and to the plurality of receiver electrodes. The processor is configured to drive a first one of the common electrodes for updating, during a first time period of a first display frame, a first one of the display lines and a second common electrode for updating, during a second time period of the first display frame, a second one of the display lines. The processor is configured to drive first transmitter electrode for capacitive sensing during a third time period of the first display frame where the first transmitter electrode comprise at least one of the plurality of common electrodes, and the third time period being at least as long as the first time period and occurring after the first time period and before the second time period. The processor is configured to receive resulting signals on at least one of the plurality of receiver electrodes while driving the first transmitter electrode during the third time period and determine positional information for an input object based on the resulting signals.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
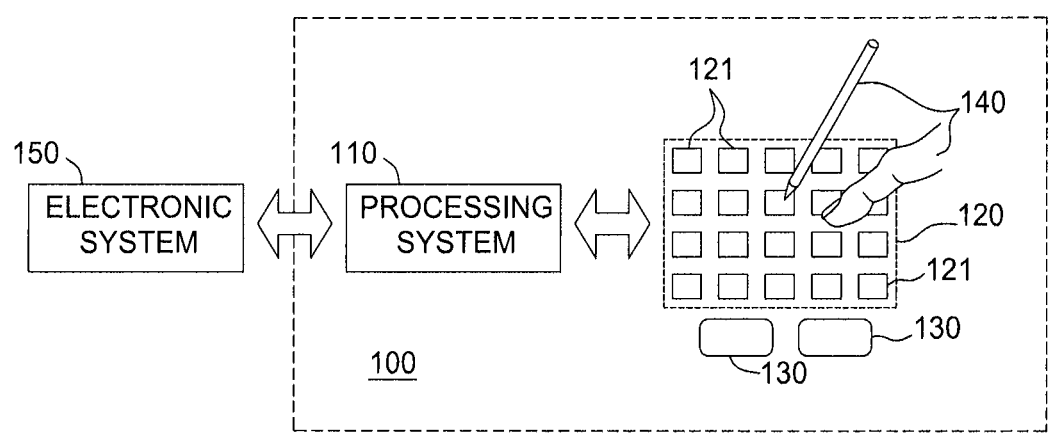
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Input devices with display screens periodically update (refresh) the screen by selectively driving common electrodes corresponding to pixels in the screen's display lines. In general, the input devices drive each electrode until each display line (and each pixel) of a display frame is updated. As used herein, a display frame includes the necessary information for updating, at least once, a defined portion of the display lines in a display screen. For example, if the input device updates the display screen sixty times a second, the input device receives sixty display frames which the input device uses to update each display line sixty times. Moreover, a display frame may not include all the display lines in the display screen. For example, only a portion of the display screen may be actively displaying an image, and thus, the display frames may contain only the data needed to update the display lines in the active portion.

In addition to updating the display, the input device may perform capacitive sensing using the display screen as a proximity sensing area. Moreover, the input device may interleave periods of capacitive sensing between periods of updating the display based on a display frame. For example, the input device may update the first half of the display lines of the display screen, pause display updating, perform capacitive sensing, and finish updating the rest of the display lines. In this manner, the time period necessary for updating a screen based on a single display frame includes one or more interleaved periods of capacitive sensing. Further still, the input device may use common electrodes for both updating the display and performing capacitive sensing.

In one embodiment, the periods of capacitive sensing may be at least as long as the time period needed to update a single display line. For example, the input device may use one or more common electrodes to update a single display line. After the line is updated, but before starting on the next display line, the input device may use the same common electrodes for capacitive sensing for a similar amount of time. Performing capacitive sensing for a time period at least equal to the time needed to update a display line may permit the input device to use contiguous sensing cycles to measure a capacitance or a change in capacitance associated with one or more of the common electrodes. That is, the capacitance measurement can be obtained without interrupting the sensing cycles.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
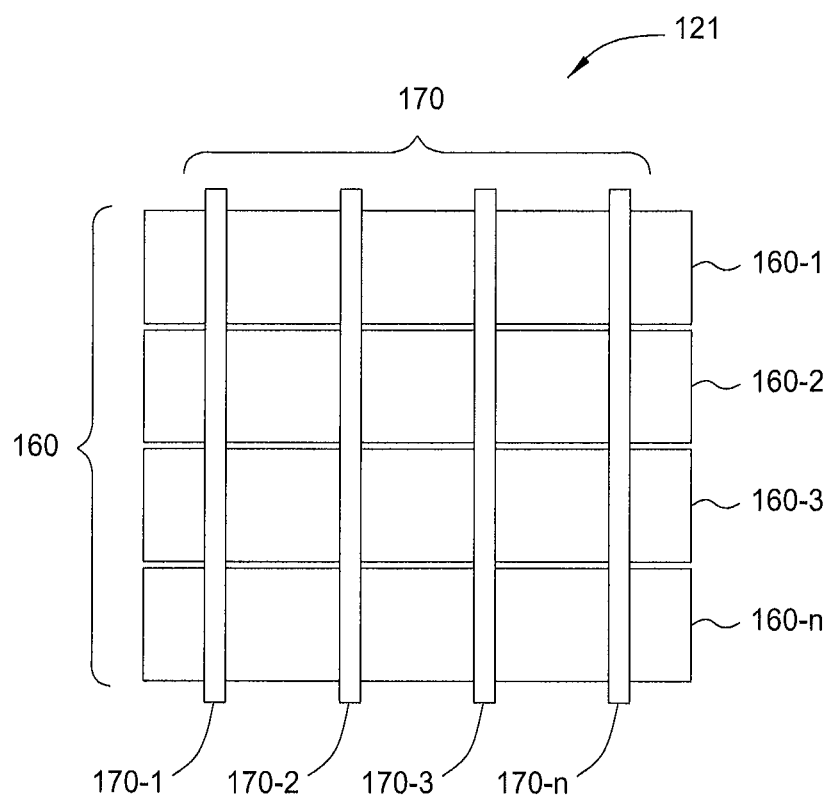
FIG. 2 illustrates a stack-up of a sensor assembly that may be used in the input device to sense the input object, according to an embodiment described herein.

FIG. 2 shows a portion of an exemplary pattern of sensing elements 121 configured to sense in a sensing region associated with the pattern, according to some embodiments. For clarity of illustration and description, FIG. 2 shows the sensing elements 121 in a pattern of simple rectangles, and does not show various components. This pattern of sensing elements 121 comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of transmitter electrodes 160. In one embodiment, this pattern of sensing elements 121 comprises a plurality of transmitter electrodes 160 (160-1, 160-2, 160-3, . . . 160-n), and a plurality of receiver electrodes 170 (170-1, 170-2, 170-3, . . . 170-n) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode" or source drive electrode) used in updating the display of the display screen. These common electrodes may be disposed on an appropriate display screen substrate. For example, the common electrodes may be disposed on the TFT glass in some display screens (e.g., In Plane Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Performing Capacitive Sensing Between Display Line Updates

Figure 3:
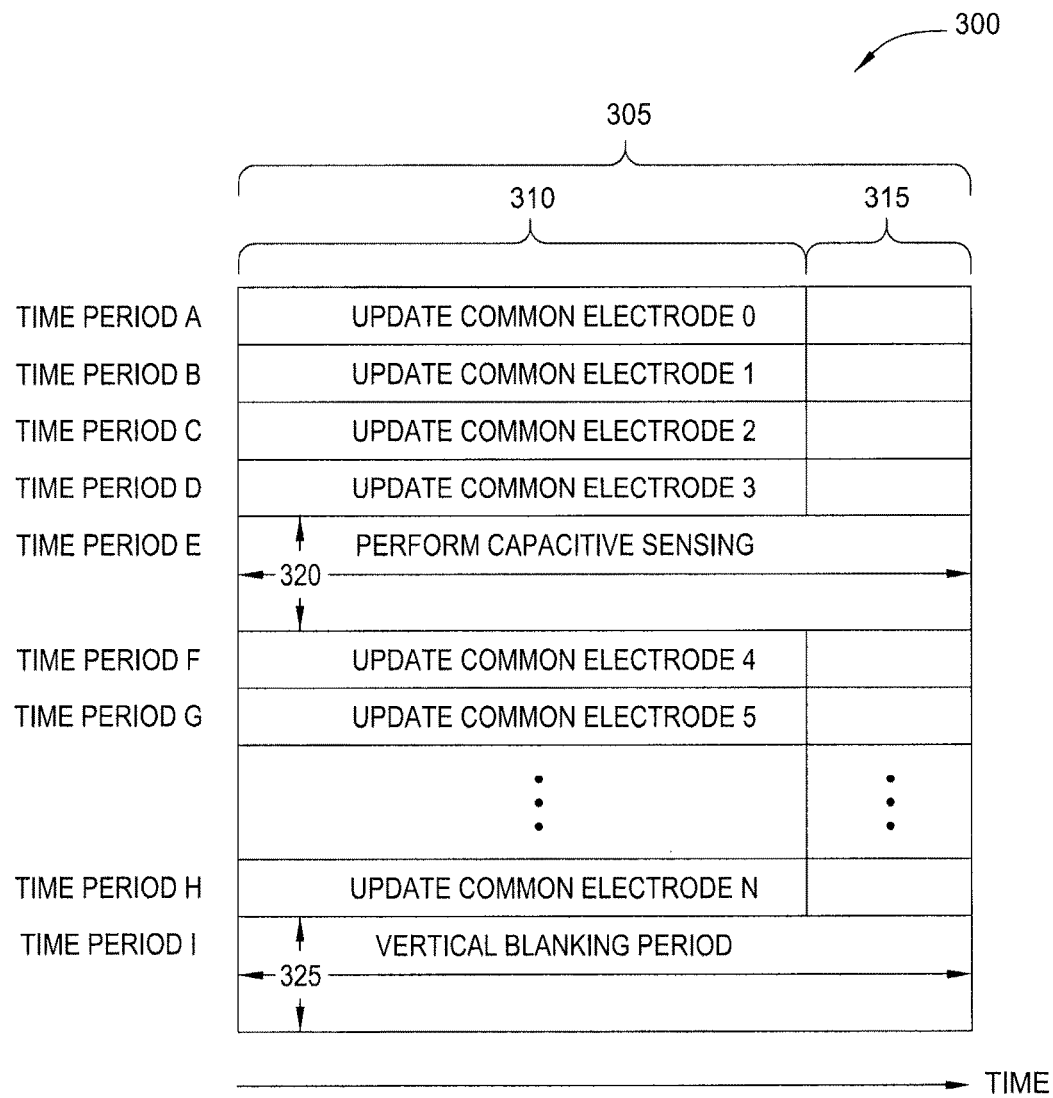
FIG. 3 is a timing chart for processing a display frame with interleaved capacitive sensing periods, according to one embodiment disclosed herein.

FIG. 3 is a timing chart 300 for processing a display frame with interleaved capacitive sensing periods, according to one embodiment disclosed herein. Specifically, the timing chart 300 illustrates the different time periods in a display frame. Time periods A-D and F-H each represent the time used to update a single display line of a display screen in the input device. This display line update time is further divided into a time period used to update the pixels 310 of the display line and a buffer time 315 that occurs between each display line update 305. The buffer time 315 may be also referred to as a horizontal blanking period 315. The driver module may use the horizontal blanking period 315 to, for example, retrieve data needed to update the next display line, drive a voltage onto the common electrode(s) corresponding to the display line, or allow signals to settle to reduce interference when updating subsequent display lines. Nonetheless, the embodiments disclosed herein are not limited to an input device with a horizontal blanking period 315 and may be used in a system where there is no buffer time between the pixel update period 310 and the next display line update 305. In various embodiments, the horizontal blanking time 315 is reduced in length such that it is substantially non-existent. In other embodiments, the horizontal blanking time 315 is reduced in length such that it is no longer than the time needed to configure a common electrode to update a display line.

Moreover, the common electrodes 0-N may be driven for display updating in any order. For example, the driver module may update a display line at the top of the display screen, and in the subsequent display line update 305, update a display line at the bottom of the screen. As a result, the input device may sequentially drive two common electrodes that are not located sequentially in the display screen. Further still, a display frame may not update each display line of the display screen if, for example, only a portion of the display screen is actively displaying information. Thus, the common electrodes 0-N in chart 300 may represent only a portion of the common electrodes in the input device.

In one embodiment time period E represents the time for capacitive sensing, or a capacitive sensing period. Time period E maybe at least as long as the time to update a single line of the display screen. In another embodiment, time period E is longer than the time to update a single line of a display screen. Moreover, the input device may use the same common electrodes used to update the pixels of the display screen to drive transmitter signals. That is, the common electrodes may serve dual purposes. During a display update period, a common electrode updates the pixels in the display, but during a capacitive sensing period, the common electrodes are used as transmitter electrodes.

In one embodiment, after updating display lines during time periods A-D, the driver module may pause display updating and use time period E to perform capacitive sensing. During this time period, the driver module may not update any of the pixels in the display screen. Additionally, the driver module may drive transmitter signals on at least one electrode transmitter electrode (e.g., at least one a common electrode) in the display screen. Based on the resulting signals received which include effects corresponding to the transmitter signals, the input device derives positional information of an input object proximate to a sensing region of the device. In one embodiment, the input device measures a change in capacitive coupling between the common electrode driving the transmitter signal and a receiver electrode. This capacitive change is then used to derive the positional information of an input object. Although the embodiments provided herein discuss using the common electrodes for transmitting the transmitter signals, in other embodiments the common electrodes may be used as the receiver electrodes for receiving a resulting signal instead of the electrodes that drive the transmitter signal. For example, the input device may include a separate set of electrodes that drive the transmitter signals that generate the resulting signals on the common electrodes. Further still, in another embodiment, a first common electrode set may be configured transmit transmitter signals and a second common electrode set may be configured to receive resulting signals. In various embodiments, during time period E, a transmitter electrode may be driven for capacitive sensing, where the transmitter electrode is separate from the common electrodes.

In one embodiment, the driver module performs the capacitive sensing during a plurality of consecutive horizontal blanking periods 315, for example, during the horizontal blanking periods 315 for time periods A-D. During each individual horizontal blanking period 315, only a portion of the information needed to acquire the capacitive measurement may be captured. The horizontal blanking periods 315 may be too short for the input device to derive an accurate capacitive measurement for a particular transmitting electrode. However, after a performing capacitive sensing during a plurality of horizontal blanking periods 315, the input device may derive an accurate measurement of the change in capacitive coupling for a selected electrode. Such a method of capacitive sensing during a horizontal blanking time 315 is referred to herein as non-contiguous capacitive sensing because the sensing cycles for obtaining the capacitive measurement for a particular electrode are transmitted intermittently during each consecutive horizontal blanking period 315. Stated differently, non-contiguous capacitive sensing may be when capacitive sensing for a single electrode (or a group of selected electrodes) extends over two or more discontinuous time periods.

Alternatively or additionally, the driver module may pause updating the display in order to perform capacitance sensing. As shown in chart 300, the driver module updates the pixels associated with common electrodes 0-3 during time periods A-D. However, at time period E, display updating is paused (i.e., the driver module does not continue to update the next display line in the frame) while capacitive sensing is performed. Specifically, the capacitive sensing periods 320 are interleaved with the display line updates of the display frame. Accordingly, the capacitive sensing period may also be referred to as an in-frame blanking period, a long horizontal blanking period, or a long h-blank period where display updating is paused while the driver module performs capacitive sensing. The driver module resumes display updating for the same display frame after the capacitive sensing period 320 is finished. In one embodiment, the capacitive sensing periods 320 are longer than the horizontal blanking periods 315 and, in some embodiments, are at least as long as the pixel update period 310 or the display line update 305. While shown as being as long as display update period 305, in various embodiments, the capacitive sensing period 320 may be longer than a display update period 305. As shown, time period E is three times as long (as shown by the horizontal and vertical arrows) as other time periods in chart 300—i.e., time periods A-D and F-H. However, the duration of the capacitive sensing periods 320 may be adjusted according to the particular design of the input device. In addition to performing capacitive sensing during period 320, in one embodiment the driver module also performs capacitive sensing during one or more horizontal blanking periods 315 of the display line updates 305.

Allowing the capacitive sensing to occur during the capacitive sensing period 320 may allow the input device to measure accurately the change in capacitance for the selected electrodes (i.e., electrodes driving the transmitter signal) without interruption or to improve interference susceptibility. Accordingly, performing capacitive sensing during an capacitive sensing period 320 is referred to herein as contiguous capacitive sensing since change in capacitive coupling is measured for a selected electrode or group of electrodes in a continuous time period.

Furthermore, the driver module may perform capacitive sensing using the electrodes that were used in the previous display update period. For example, during time period E, the driver module may drive a transmitter signal simultaneously on common electrodes 0-3. In this manner, the driver module may use one or more common electrodes to update the pixels in a display line and, before continuing to update the other display lines in the display frame, perform capacitive sensing using those same electrodes.

When display updating is paused, the driver module may still drive signals on the common electrodes that are not driving the transmitter signal. For example, while the transmitter signal is transmitted on one or more electrodes, the driver module may apply a reference voltage (or another other signal) to other common electrodes in the display screen. Fixing the common electrodes currently not being used for capacitive sensing to a reference voltage may improve the ability of the input device to derive accurate positional information for the input object. Thus, when display updating is paused, the driver module may cease to update the pixels in the display screen but still use the common electrodes for capacitive sensing.

The vertical blanking period 325 is the period between the last display line update period of a display frame and the beginning of a row update period in a subsequent display frame. Although not shown in FIG. 3, the timing chart 300 may also include a second vertical blanking period at the beginning of updating a display based on a received display frame—i.e., before time period A. Because the input device does not update the display during these vertical blanking periods, in some embodiments, the driver module may also use either the first or the second vertical blanking periods (or both) to perform capacitance sensing. Similar to the capacitive sensing period 320, the vertical blanking periods 325 facilitate contiguous capacitive sensing since both of these blanking periods may provide a sufficient length of time to measure the change in capacitance associated with a selected common electrode without significant interruptions. However, the vertical blanking period 325 is distinguished from the capacitive sensing period 320 since this period 325 falls either at the beginning or end of the display frame update while the capacitive sensing period 320 is inserted between display line updates of the same display frame.

In many embodiments, the length of a horizontal blanking period 315, capacitive sensing period 320 and/or a vertical blanking period 325 may be changed. However, the display frame rate may not be able to be changed. Therefore, as the length of one of these non-display update periods is changed, at least one of the other non-display update periods may also change. For example, in an embodiment where a capacitive sensing period 320 is included within the display frame, the duration of the horizontal blanking periods 315 and/or the vertical blanking period 325 may be decreased correspondingly. By reducing the horizontal blanking periods 315 corresponding to the display line update periods 305 of a first set of common electrodes, a capacitive sensing period 320 may be inserted within a display frame. Given that a horizontal blanking period 315 is "T" μs long, reducing the horizontal blanking period 315 to "N" μs for "M" corresponding common electrodes means an in-frame blanking period 320 of length "(T−N)*M" μs may be created. In one embodiment, T−N may be reduced such that the horizontal blanking periods 315 still provide enough time for the necessary display update procedures. The duration of a capacitive sensing period 320 may be based on a sum of the reduction of each horizontal blanking period 315. In other embodiments, the duration of the in-frame blanking period 315 may be based on changing the vertical blanking period 325, or based on changing both the horizontal blanking periods 315 and the vertical blanking period 325.

The duration of an capacitive sensing period 320 may be set according to, for example, the amount of time required to perform contiguous capacitive sensing for a corresponding group of common electrodes, to mitigate noise from switching between capacitive sensing and display updating, or to perform frequency hopping or change in the capacitive sensing frame rate to reduce noise interference. For example, for a group of common electrodes, 100 μs may be needed for contiguous capacitive sensing. Therefore, a corresponding capacitive sensing period 320 is determined to be at least 100 μs in length. To free up 100 μs but still maintain the desired frame rate, one or more of the horizontal blanking periods 315 or the vertical blanking period 325 may be reduced.

Even though FIG. 3 was described in an embodiment where common electrodes 0-N are used for both updating a display and performing capacitive sensing, this disclosure is not limited to such. In one embodiment, the input device may use in-frame blanking periods to perform capacitive sensing even if the transmitter signals are driven on electrodes that are not used when updating the display. Because the electrodes used for display updating and the electrodes used for capacitive sensing may be in close proximity in the input device, performing the two functions in mutually exclusive time periods may reduce the amount of electrical interference between the different electrode sets.

Figure 4:
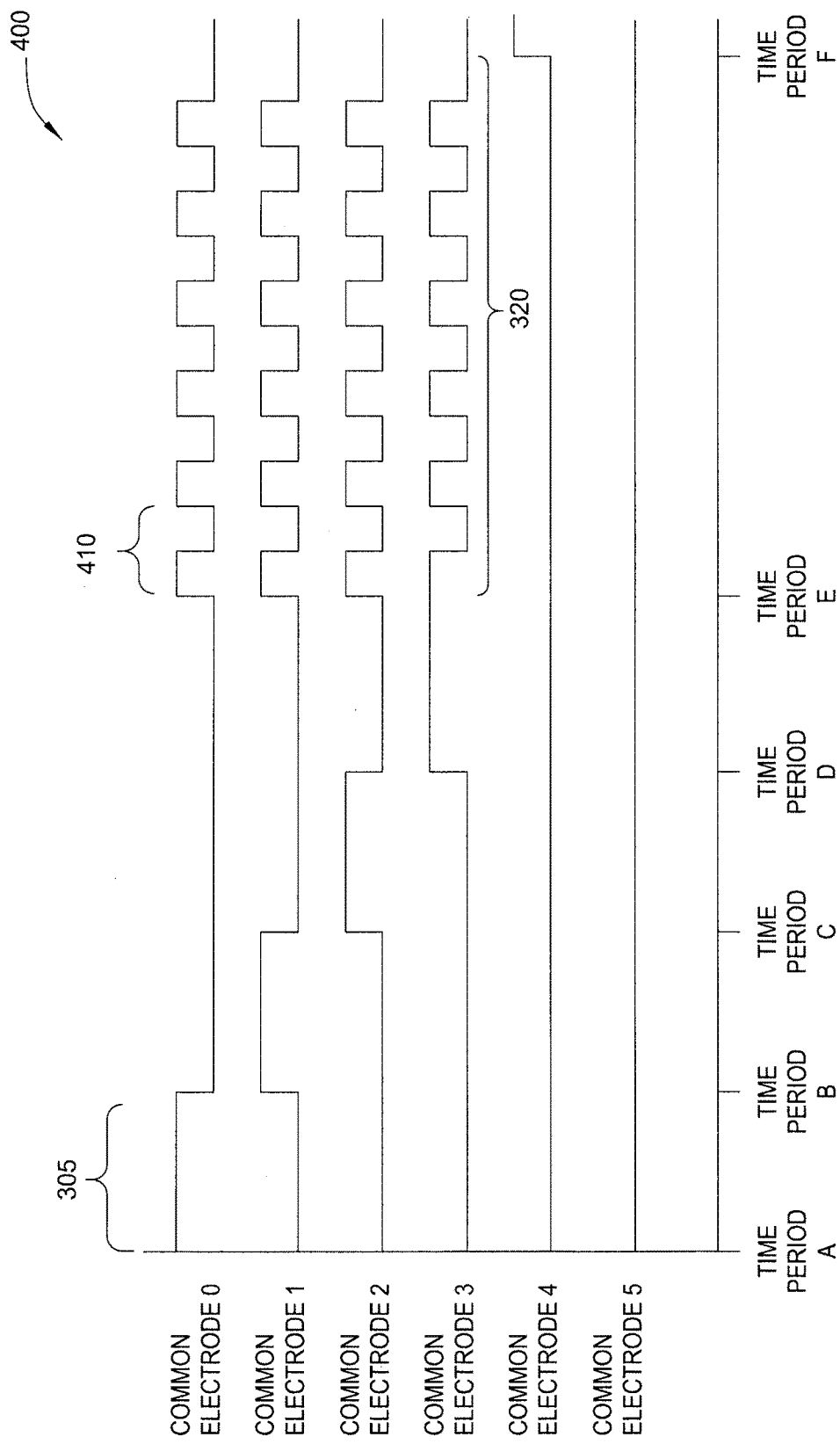
FIG. 4 is a timing diagram for interleaving a capacitive sensing period into a display frame update, according to one embodiment disclosed herein.

FIG. 4 is a timing diagram for interleaving a capacitive sensing period into a display frame update, according to one embodiment disclosed herein. The timing diagram 400 includes the waveforms propagated on common electrodes 0-5 during the time periods A-F shown in FIG. 3. During time periods A-D, the driver module activates one of the common electrodes and updates the pixels associated with the corresponding display line. While one electrode is activated, the other electrodes may be kept at a constant voltage. Moreover, the common electrodes may not switch instantaneously at each time period as shown (e.g., electrode 0 switches off as electrode 1 switches on). Instead, there may be some delay—e.g., the horizontal blanking period—where the electrodes ramp up or ramp down. In various embodiments, multiple common electrodes may be driven in a delayed manner, where a first common electrode is activated, then after some delay, a second common electrode is driven.

During time period E, the driver module pauses display updating and switches to capacitive sensing. In FIG. 4, one or more common electrodes are grouped into a transmitter electrode where the transmitter signal (e.g., the square wave) is transmitted simultaneously on each common electrode assigned to the transmitter electrode. For example, a display device may include hundreds of common electrodes but, when performing capacitance sensing, the device may segment the common electrodes into transmitter electrodes (e.g., around 20 transmitter electrodes of 40 common electrodes each) where each transmitter electrode is treated as a single transmitter electrode. In another embodiment, the common voltage electrode may be segmented into a plurality of common electrodes, where a transmitter electrode comprises a single common electrode. Further, in other embodiments, the common voltage electrode may be segmented into any number of common electrodes, where any number of common electrodes may be combined to form a transmitter electrode. For simplicity, FIG. 4 illustrates an embodiment where common electrodes 0-3 are assigned to one transmitter electrode and are each driven by the same transmitter signal. Alternatively, in other display devices, the common electrodes may be a single electrode "plane" made up of a plurality of common electrode segments (common electrodes) are driven to a same reference voltage during display updating. During capacitive sensing however, the different common electrode segments (i.e., common electrodes) of the electrode plane are used to transmit the transmitter signals at different times, performing as one or more transmitter electrodes.

The capacitance sensing period may further be divided into a plurality of sensing cycles 410 (or touch cycles). Advantageously, using an in-frame blanking period may permit the driver module to drive a plurality of contiguous sensing cycles sufficient for deriving a change in capacitance between the electrode block and one or more receiver electrodes. For example, assuming the input device performs six sensing cycles 410 in order to accurately measure the change of capacitance but can only perform two sensing cycles 410 during a horizontal blanking period 315, the driver module must use at least three horizontal blanking periods 315 for each electrode block. Conversely, with the in-frame blanking period 320 shown in FIG. 4, the input device measures the six sensing cycles 410 contiguously without updating the display between the sensing cycles 410.

Of course, the input device may be configured to perform more or less than six cycles during a capacitive sensing period 320. Moreover, the input device may perform capacitance sensing on multiple transmitter electrodes during a single capacitive sensing period 320. For example, the driver module may drive the necessary sensing cycles 410 on common electrodes 0-3 and then drive the necessary sensing cycles on common electrodes 4-7. Further still, the driver module may also drive a voltage on the other common electrodes that are not used for capacitance sensing during the in-frame blank period 320. That is, instead of permitting the voltage on the other common electrodes (e.g., common electrode 4 and 5) to float, the driver module may drive a substantially constant voltage (e.g., a reference voltage) on these electrodes.

In one embodiment, the input device transmits a transmitter signal on multiple transmitter electrodes simultaneously during a capacitive sensing period 320. Although not shown, the driver module may output a different transmitter signal on each transmitter electrode based on a multiplexing schema such as code division multiplexing or orthogonal frequency division multiplexing. Thus, the embodiments disclosed herein are not limited to transmitting the same transmitter signal on a subset of the common electrodes but may transmit different transmitter signals on a plurality of transmitter electrodes simultaneously in order to measure the change of capacitance between the transmitter electrodes and the receiver electrodes.

Figure 5:
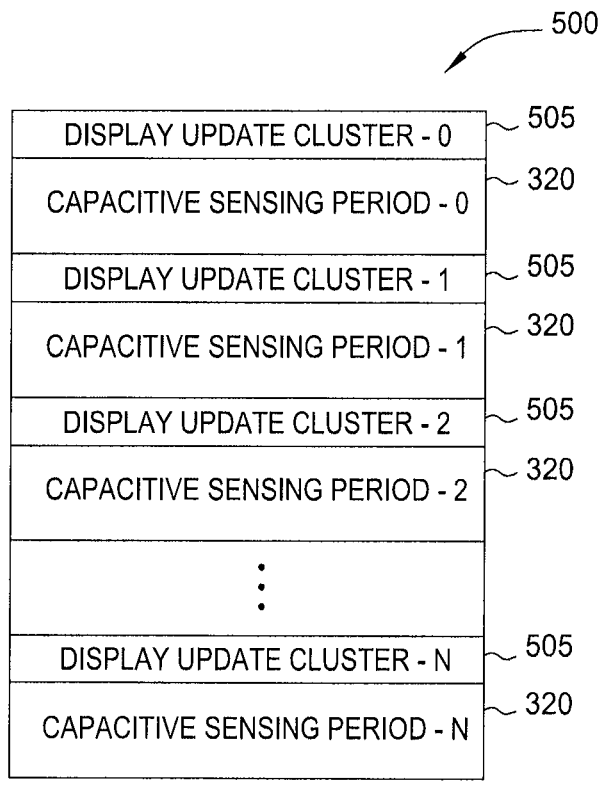
FIG. 5 is a timing chart for processing a display frame with interleaved capacitive sensing periods, according to one embodiment disclosed herein.

FIG. 5 is a timing chart for processing a display frame with interleaved capacitive sensing periods, according to one embodiment disclosed herein. In contrast to FIG. 3, timing chart 500 illustrates the timing for updating a signal display frame with multiple capacitive sensing periods 320. As used herein, a plurality of sequential display line updates are referred to as a display update cluster 505. Accordingly, referring to FIG. 3, the display line updates performed during time periods A-D may be described as a single display update cluster 505. Each display update cluster 505 (or capacitive sensing period) in a display frame update may be similar in duration or have different durations. Furthermore, the number of common electrodes in a display update cluster 505 may be the same number of common electrodes used for capacitance sensing in each capacitive sensing period 320 or the number of electrodes used may be different.

Figure 6:
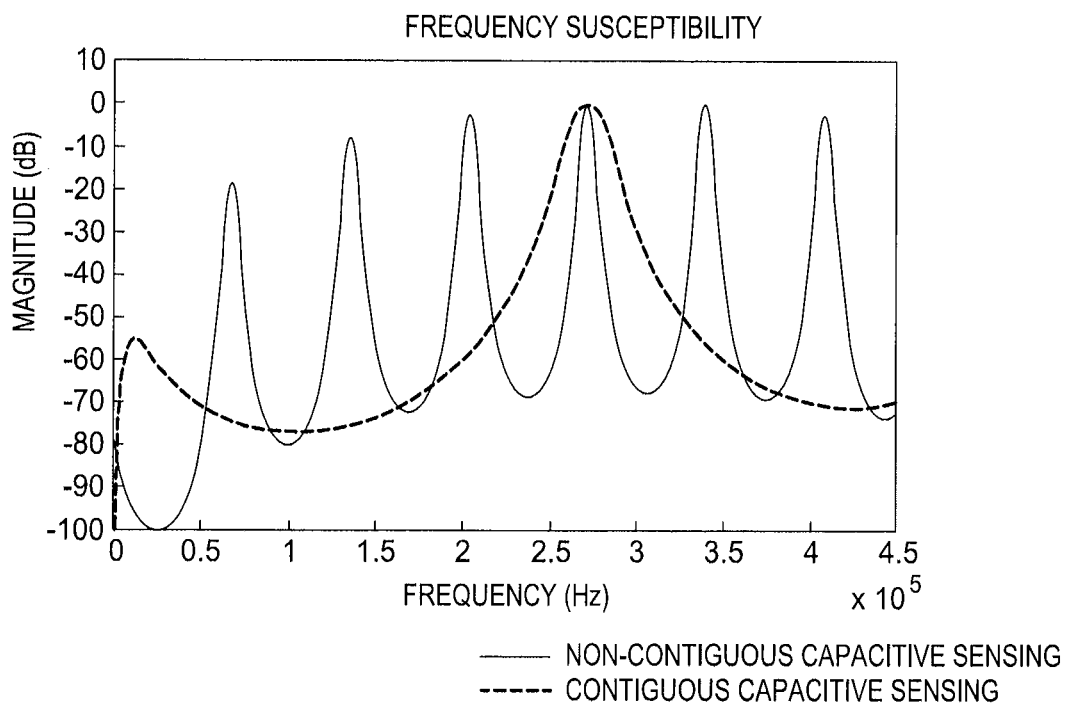
FIG. 6 is a graph illustrating noise susceptibility when switching between display updating and capacitive sensing, according to one embodiment disclosed herein.

FIG. 6 is a graph illustrating noise susceptibility when switching between display updating and capacitive sensing, according to one embodiment disclosed herein. The interference susceptibility of the input device may be reduced by performing capacitive sensing during an in-frame blanking period. Capacitive sensing during the in-frame blanking period allows for the capacitive coupling between a block of common electrodes and receiver electrodes to be determined in a contiguous manner. In one embodiment, the interference susceptibility is reduced in frequencies below those pertaining to the response of an input object. Further, capacitive sensing during an in-frame update period may provide a frequency response that has a wider lobe with fewer harmonics. In one embodiment, the main lobe is proximate to the frequency response of an input object. FIG. 6 illustrates a comparison between the frequency susceptibility of non-contiguous capacitive sensing and contiguous capacitive sensing. As shown, the frequency susceptibility for non-contiguous capacitive sensing includes more peaks, which may increase the interference susceptibility of the input device near those peaks. For example, for low frequency, contiguous capacitive sensing is substantially immune to lower frequency interference, while non-contiguous capacitive sensing may be susceptible to such interference as illustrated by the lobes at 75 kHz, 140 kHz, and 210 kHz. In one embodiment, an external power supply may introduce low frequency interference (e.g., below 200 kHz). In such an embodiment, transmitting signals for capacitive sensing with common electrodes during an in-frame blanking period (contiguous capacitive sensing) reduces susceptibility to such interference.

In one embodiment, the input device may shift frequencies it uses to transmit the transmitter signals on the common electrodes. For example, the common electrodes are configured to transmit a first transmitter signal for capacitive sensing during in-frame blanking period, the first transmitter signal having a first transmitter frequency. In response to measuring interference at the first transmitter frequency, the drive module may drive a second transmitter signal having a second frequency different from the first transmitter frequency on the common electrodes. The input device may compare the detected interference to one or more thresholds and switch from the first frequency to the second frequency (or back to the first frequency from the second frequency) when the interference meets or exceeds one of the thresholds. Moreover, the second transmitter signal may include at least one of a different amplitude, phase, polarity, frequency and waveform from the first transmitter signal. The waveform of either the first or second transmitter signals may be one of a square waveform, triangular waveform, sawtooth waveform, sinusoidal waveform, or the like. Furthermore, the length of the in blanking period may be adjusted to accommodate frequency hopping. That is, the ratio of time used in a display frame between in-frame blanking periods and display updating may change in order to switch to different transmitter signals. In one embodiment, in an in-frame blanking period needs to be lengthened to switch to a transmitter signal with a different frequency, the processing system may move the blanking period to a subsequent frame to preserve a minimum display screen refresh rate.

In one embodiment, receiver electrodes may be configured to receive resulting interference signals during at least a portion of an in-frame blanking period. During this time, the common electrode(s) may be floating or tied to a specific DC voltage. These interference signals may then be used to determine which transmitter signal (i.e., which frequency) to transmit. The transmitter signal is selected based on the resulting interference signal such that interference may be reduced.

Figure 7:
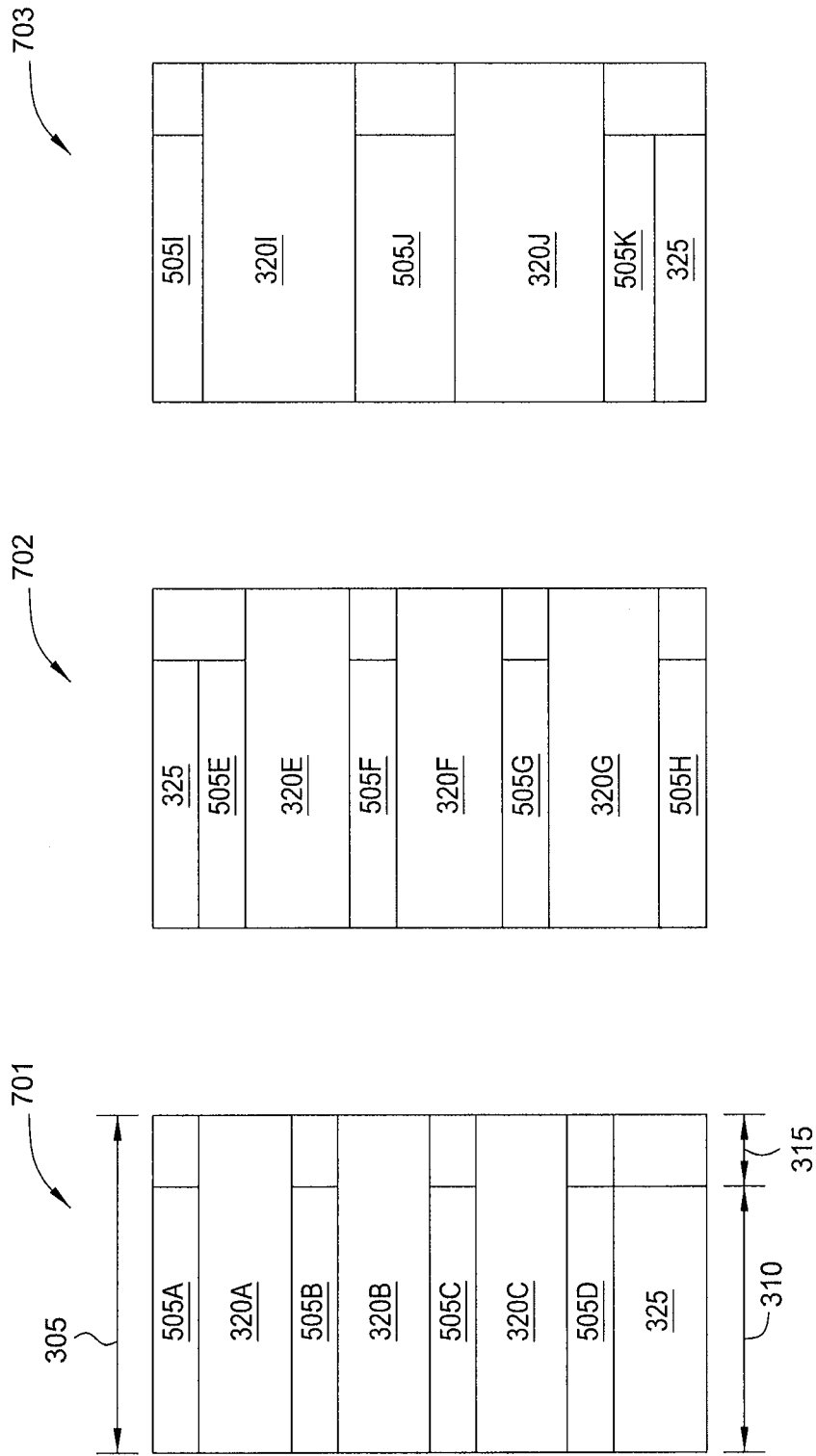
FIGS. 7A-7C are timing charts for processing a display frame with interleaved capacitive sensing periods, according to embodiments disclosed herein.

FIGS. 7A-7C are timing charts for processing a display frame with interleaved capacitive sensing periods, according to embodiments disclosed herein. Specifically, FIG. 7A illustrates a timing chart 701 for a first display frame. Similar to the timing chart in FIG. 5, chart 701 includes multiple display line update periods 305, each including a pixel update period 310 and a horizontal blanking period 315, grouped to form multiple display update clusters 505. These clusters 505 are interleaved with a plurality of capacitive sensing periods 320. The duration of the clusters 505 may be related or unrelated with the duration of the capacitive sensing periods 320. For example, the input device may set the duration of the clusters 505 and the capacitive sensing periods 320 (by adjusting the vertical or horizontal blanking periods) based on a predefined ratio. Alternatively, the duration of the capacitive sensing periods 320 may be independently set without regards to the duration of the clusters 505 or based solely on mitigating noise that may occur from performing non-contiguous capacitive sensing.

The display screen is updated based on the display frame by updating the display lines during the display update clusters 505A-D. However, the driver module pauses updating the display after each cluster 505A-C to perform capacitance sensing during the capacitive sensing periods 320A-C. For example, the input device may update the pixels associated with the electrodes in the display update cluster 505A and then perform capacitance sensing on those same electrodes during capacitive sensing period 320A. Alternatively, the driver module may perform capacitance sensing on at least one electrode that was not updated in the previous display update cluster 505. To reduce interference, in one embodiment the driver module performs capacitance sensing on electrodes on a different portion of the display screen from the display lines that were recently updated. This may avoid electrical interference (capacitances, inductances, and the like) that temporarily affect the common electrodes even after updating the display is paused and capacitance sensing has begun.

FIG. 7B-7C illustrate two different embodiments of timing charts 702, 703 for updating a display screen based on a second display frame that was received after the first display frame shown in FIG. 7A. That is, FIGS. 7B and 7C illustrate that the timing chart may change for each subsequent frame. In one embodiment, visual artifacts within a display image due to interleaving display updating with capacitive sensing may be reduced by varying properties of the capacitive sensing period from display frame to display frame. This variation may be done in a random or non-random manner.

FIG. 7B illustrates shifting the display update clusters 505E-G and capacitive sensing periods 320E-H relative to the clusters 505A-D and capacitive sensing periods 320A-C shown in FIG. 7A. The total duration of the timing charts 701 and 702 is the same, but how that time is divided into the different periods is altered. For example, instead of starting with a display update cluster 505, timing chart 702 moves the vertical blanking period 325 (or only a portion thereof) to the beginning of the display frame update. As discussed previously, the input device may perform capacitance sensing during the vertical blanking period 325. The timing between the different display update clusters 505E-G, however, may remain the same. That is, the duration of the capacitive sensing periods 320E-G that separate the display update clusters 505 is preserved relative to the duration of the capacitive sensing periods 320A-C. Doing so may maintain the timing between the driver module and a video source that is transmitting the display frames to the driver yet still prevent or remove visual artifacts.

FIG. 7C illustrates that the duration of the individual display update clusters 505 and capacitive sensing periods 320 may change between subsequent frames—i.e., between the first frame shown in FIG. 7A and the second frame shown in FIG. 7C. For example, the display update cluster 505I starts at the same location in the timing chart 702 as display cluster 505A in timing chart 701, but the duration of the capacitive sensing period 320I is increased relative to the blanking period 320A. In one embodiment, the added length of capacitive sensing period 320I may come from shrinking one or more horizontal blanking periods 315, the vertical blanking period 325, or increasing the number of corresponding horizontal blanking periods 315. Alternatively, as shown in FIG. 7C, the input device uses only two capacitive sensing periods 320I and 320J instead of the three capacitive sensing periods 320A-C shown in timing chart 701. The extra time saved by eliminating one of the in-frame blanking periods may be used to expand one or both of the remaining capacitive sensing periods 320. Moreover, increasing the blanking periods 320 inherently increases the time separation between the display update clusters 505. Changing this spacing may aid in preventing or removing visual artifacts.

The timing chart 703 also illustrates increasing the duration of the display update clusters 505 by eliminating one of the clusters shown in FIG. 7A and adding the extra time to the remaining display update clusters 505I-K. Here, the duration of cluster 505J is extended to be twice that of the other clusters 505I and 505K. In this manner, the input device may further rearrange the display update clusters 505I-K relative to the display update clusters 505A-D used in the previously display frame.

In addition to mitigating noise relative to input device that perform non-contiguous capacitive sensing, FIGS. 7A-C illustrate different techniques for rearranging or altering the display update clusters and capacitive sensing periods 320 to prevent or remove visual artifacts; however, this disclosure is not limited to only these techniques and may rely other techniques for preventing visual artifacts. In further embodiments, the position of the in-frame blanking periods may vary randomly from display frame to display frame. Moreover, the common electrode that is driven for updating the display before the start of an capacitive sensing period or the common electrode that is driven following a capacitive sensing period may change from display frame to display frame. Further, the length of a capacitive sensing period 320 may vary within a display frame such that all the capacitive sensing periods of a display frame are not the same length.

Figure 8:
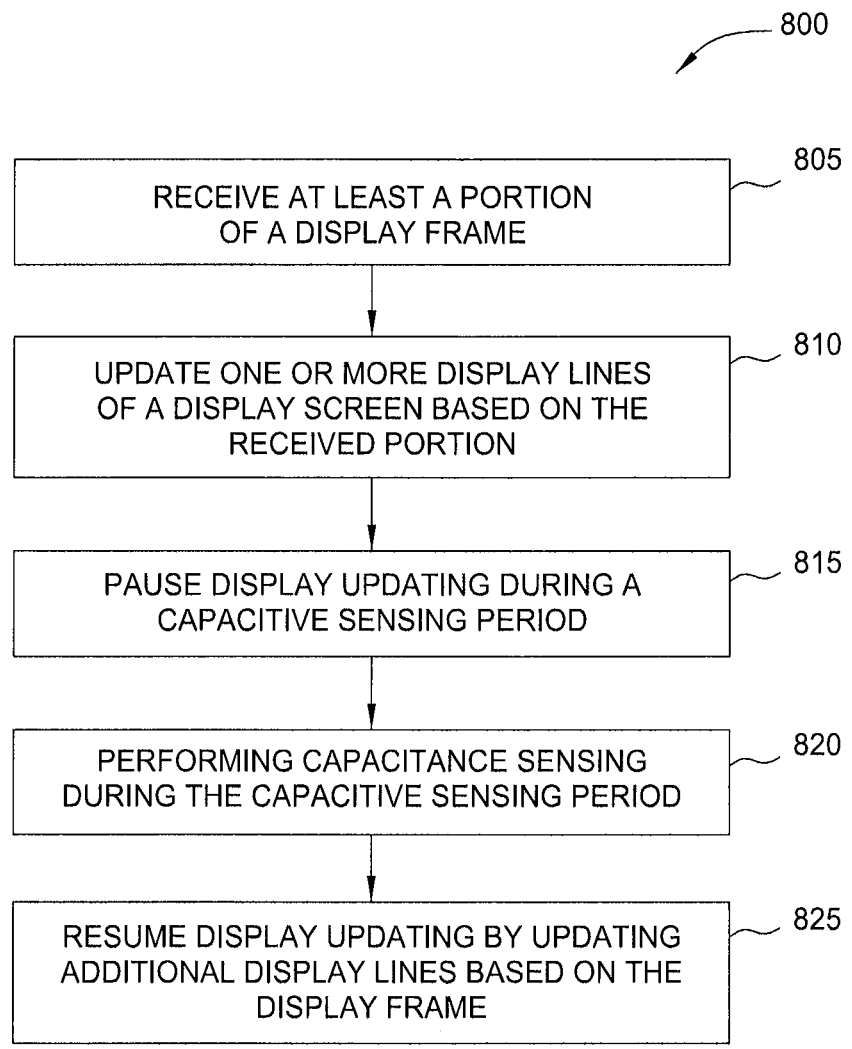
FIG. 8 illustrates a method of interleaving periods of capacitance sensing with display updating, according to an embodiment disclosed herein.

FIG. 8 illustrates a method of interleaving periods of capacitance sensing with display updating, according to an embodiment disclosed herein. The method 800 begins at step 805 with a video source transmitting a display frame to a processing system which updates the pixels of a display screen based on the frame data. The video source may transmit the display frame either as a large chunk—i.e., all the data at one time—or intermittently—i.e., smaller chunks of the display frame are transmitted at intervals.

At step 810, the driver module of the processing system updates one or more display lines of the display screen based on the received display frame data. The driver module may use, for example, a set of electrodes which includes common electrodes for generating an electric field that updates the pixels in the display screen. During a display line update, the driver module selects at least one common electrode and updates the pixels associated with that electrode. In some embodiments, the display screen may associate different color pixels with each common electrode. Thus, the driver module may perform multiple display updates using a single common electrode—e.g., an update for red, green, and blue pixels.

At step 815, display updating may be paused during an in-frame blanking period. In one embodiment, pausing display updating results in the driver module ceasing to update the pixels in the display screen. Instead of updating the display, at step 820, the driver module (or a different circuitry module) may use the common electrodes to perform capacitance sensing. The driver module drives a transmitter signal on at least one of the common electrodes (or a transmitter electrode). The transmitter signal generates a resulting signal on one or more receiver electrodes. A touch detection module may use the resulting signal to derive positional information for an input object near the touch sensitive area of the input device. In one embodiment, the touch detection module measures the capacitance or the change of capacitance between the common electrode and the receiver electrodes.

In one embodiment, the duration of the capacitive sensing period may be at least as long as the pixel update period or the display line update period. For example, the duration of the capacitive sensing period may be set according to the number of sensing cycles needed to determine the change in capacitance for one or more common electrode and the receiver electrodes. Stated differently, the input device may set the duration of the in-frame blanking period such that an accurate measure of capacitance for a common electrode may be obtained by transmitting sensing cycles contiguously—i.e., without substantial interruptions. For example, if the driver module requires ten sensing cycles to accurately obtain a capacitance measurement, the duration of the capacitive sensing period is at least long enough to perform the ten cycles.

At step 825, the processing system may resume updating the display. Specifically, the processing system updates additional display lines based on the display frame data. Moreover, the processing system may receive additional portions of the display frame in embodiments where the entire display frame is not transmitted at the same time.

An Example Display Device

Figure 9:
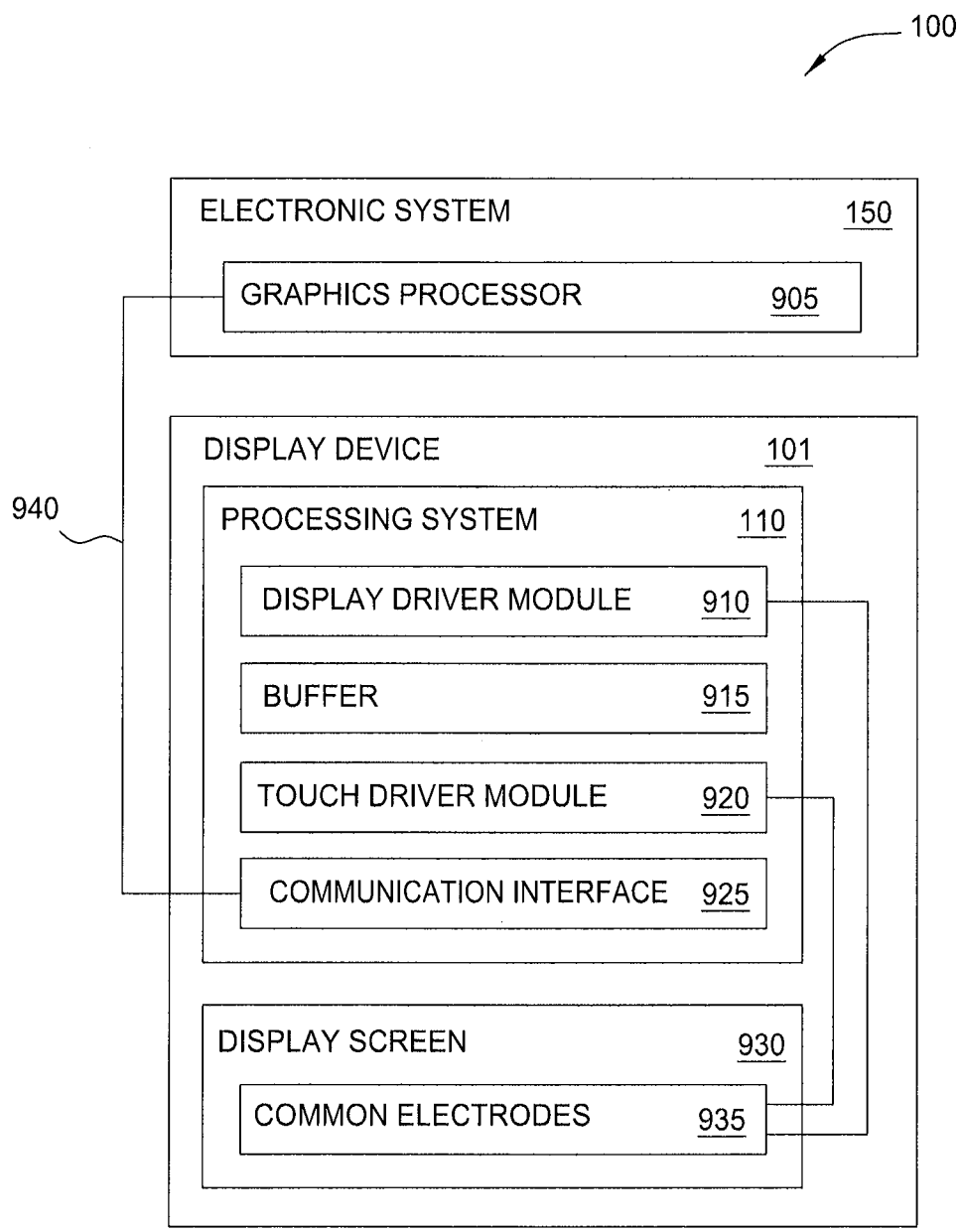
FIG. 9 illustrates a system for communicating between an electronic system and an input device that interleaves capacitive sensing periods with display updating periods, according to one embodiment disclosed herein.

FIG. 9 illustrates a system for communicating between an electronic system and an input device that interleaves capacitive sensing periods with display updating periods, according to one embodiment disclosed herein. The input device 100 includes an electronic system 150 and a display device 101 that includes an integrated sensing device. As mentioned in regards to FIG. 1, the electronic system 150 broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). The electronic system 150 includes a graphics processor 905 that transmits data to the input device 100 for display. Specifically, the graphics processor 905 transmits display frames to the input device 100, and as such, may be referred to as a video source. The processor 905 is any suitable processor for generating display data and may include multiple processors, a multi-core processor, and the like. The graphics processor 905 may be a specialized processor for performing graphics processing or a general purpose processor.

The input device 100, in one embodiment, may be configured to provide input to an electronic system 150 as well as receive and process display data transmitted from the electronic system 150. The input device 100 includes a display screen 930 and a processing system 110. The display screen 930 includes a plurality of pixels arranged as one or more display lines that are updated based on display frames received from the graphics processor 905. The electronic system 150 may include in the display frame built-in periods for the horizontal and vertical blanking periods. The processing system 110 may alter or redistribute these built in timing periods to generate the in-frame blanking periods discussed above. For example, if the display frame designates 100 µs for each horizontal blanking period, the processing system 110 may use 90 µs from each horizontal blanking period to insert one or more in-frame blanking periods into the display frame update.

The processing system 110 is configured to operate the hardware of the input device 100 to detect input in the sensing region—e.g., some portion of the display screen 930. The processing system 110 comprises parts of or all of one or more integrated circuits (ICs) and/or other circuitry components. As shown, in one embodiment, the processing system 110 includes at least a display driver module 910, a buffer 915, a touch driver module 920, and a communication interface 925. The communication interface is communicatively coupled to the electronic system 150, and more specifically, to the graphics processor 905 via connection 940. The communication interface 925 receives display frames from the graphics processor 905 which are stored in the buffer 915. However, in some embodiments, the input device may not need temporary storage to store the received display frame portions (i.e., the frame data is processes as fast as it is received), and thus, the buffer 915 may be omitted. The interface 925 may communicate with the electronic system 150 using a one or more different control signals which will be discussed in further detail below. In one embodiment, the communication interface 925 may transmit data to and receive data from the electronic system along connection 940 using buses, networks, or other wired or wireless interconnections.

The processing system 110 may use the buffer 915 to temporary store the display frames received from the graphics processor 905. The buffer 915 may be any memory storage element such as a random access memory (RAM), a plurality of bistable latching memory elements, an erasable programmable read-only memory (EPROM or Flash memory), and the like. Further, the buffer 915 may be integrated with all the other elements in the processing system 110 into a single IC or may by located "off chip" and be communicatively coupled to the other components of the processing system 110. In yet other embodiments, the buffer 915 may be integrated as part of the electronic system 120 and/or as part of the graphics processor 905. The buffer 915 may be fabricated with enough memory capacity to store at least one display frame. Stated differently, the buffer 915 is capable of storing enough data to update each pixel in the display screen 930. As the processing system 110 finishes updating the display screen 930 based on the display buffer, the buffer 915 may be cleared or replaced by another display frame transmitted from the graphics processor 905.

Alternatively, the buffer 915 may have the capacity to store only a portion of the display frame—i.e., only enough data to perform some of the display line updates in a display frame. In this embodiment, the graphics processor 905 may transmit individual chunks of the display frame to the processing system 110. The graphics processor 905, for example, may transfer a chunk of the display frame (e.g., data corresponding to ten display line updates) which is stored in the buffer 915, wait for the processing system 110 to update the display based on the data, and transmit an additional chunk—e.g., ten more display lines—after the processing system 110 requests additional data. However, this assumes that the connection 940 is able to transmit data faster than the processing system 110 can update the display screen 930. If not, the buffer 915 may constantly be swapping out data that has already been used to update the display 930 with new data received from the electronic system 150. That is, the connection 940 is constantly sending data rather than transmitting data in bursts.

The display driver module 910 may include circuitry which drives the common electrodes 935. The processing system 110 may control the display driver module 910 such that the display screen 930 is updated based on a received display frame from the graphics processor 905. That is, the display driver module 910 uses the information stored in the buffer 915 to update the pixels in the display screen 930. Although in input device 100 the display driver module 910 is connected to only the common electrodes, the module 910 may also be coupled to a second corresponding set of electrodes or transistors that are driven in tandem with the common electrodes 935 to update the pixels.

The processing system 110 includes a touch driver module 920 for performing capacitive sensing. The processing system also has the ability to switch control of the common electrodes 935 between the display driver module 910 and the touch driver module 920. Although shown as two separate elements, the circuitry or the firmware of the display driver module 910 and the circuitry or the firmware of the touch driver module 920 may be combined into a single element or integrated into a single processing system IC. Once the processing system 110 pauses display updating, the touch driver module 920 drives transmitter signals onto the common electrodes 935 for detecting changes in capacitance between the common electrodes and receiver electrodes (not shown). If the capacitance sensing occurs during an in-frame blanking period, once the capacitance sensing (or a portion thereof) is complete, the processing system 110 resumes updating the display screen 930 based on the received display frame using the display driver module 910.

The processing system 110 and electronic system 150 may use one or more control signals to communicate and regulate how or when the display frames are transmitted. The display driver 101 may be designed such that the connection 940 transmits the display frames to the processing system 110 at its fastest data bit rate even if the processing system 110 is unable to update the display at the same rate. Transmitting as much data as possible may minimize the time the connection 940 is used, thereby extending the battery life of the input device 100.

In one embodiment, the processing system 110 may use a control signal to pause the flow of display frame data from the electronic system 150 and the processing system 110. The electronic system 150 may receive a status indicator signal from the processing system 110 that includes the amount of data that has been processed from the buffer 915. For example, the processing system 110 may use the status signal to inform the electronic system 150 how much of the data in the buffer 915 has been processed. For example, if the buffer 915 holds enough data to update twenty display lines, the processing system 110 may send an alert using the status signal when the 19 display line has been updated. The electronic system 150 may use the alert to extrapolate a predicted display frame rate. That is, if the alert arrives at predictable intervals, the electronic system 150 may extrapolate a rate for transmitting the display frame to the processing system 110—e.g., transmit twenty lines of the display frame every 100 μs. Thus, even if the status signal is no longer transmitted, the electronic system 150 may use the extrapolated rate to continue to send updated display data. Alternatively, the electronic system 150 or the processing system 110 may be preconfigured to operate at a certain rate, and thus, the status signal is not necessary.

However, the extrapolated rate may cause an underflow or overflow in the buffer 915 when display updating is paused to perform capacitance sensing during in-frame blanking periods. For example, FIGS. 7B and 7C show rearranging the display update clusters 505 and capacitive sensing periods 320 in subsequent display frames. Referring to FIG. 7B, because the display frame does not start with a display update cluster, the electronic system 150 may transmit additional frame data using the connection 940 even though the processing system 110 has not yet processed the frame data already in the buffer 915, which may cause an overflow. Alternatively, referring to FIG. 7C, the display update cluster 505J has a longer duration than the other clusters 505A-D in the first frame. Accordingly, the processing system 110 may still be attempting to update the display screen during display update cluster 505J even when the display driver module 910 has exhausted the data in the buffer 915, resulting in an underflow. Accordingly, the processing system 110 and electronic 150 may need to change the extrapolated rate or use a different communication technique to mitigate or prevent buffer underflows and overflows.

In one embodiment, the processing signal 110 may prevent underflow or overflows by using the status signal to pause display updating. For example, the processing system 110 may include logic for determining when to switch between a display update cluster period and an in-frame blocking period. Once determining to begin capacitance sensing, the processing system ceases sending updates in response to the status signal. In this embodiment, the electronic system 150 does not rely on an extrapolated rate to determine when to send a display frame and instead transmits a display frame in response to receiving an alert on the status signal. In one embodiment, the processing system 110 pauses display updating by switching control of the common electrodes 935 to the touch driver module 920 and ceasing to send updates of the buffer's usage on the status signal. Without receiving updates or alerts, the graphics processor 905 temporarily stops sending the display frame, or portions thereof, to the processing system 110. Once the processing system 110 determines to resume updating the display—i.e., the in-frame blocking period has, or is about to, complete—the status signal may transmit an alert to the electronic system 150 which responds by transmitting a portion (or an entire) display frame to the processing system 110. Because of latency or other processing time, the processing system 110 may instruct the electronic system 150 to begin sending more display frame data before the in-frame blanking period is over to ensure that the display line updates can begin once the blanking period is complete. Note that the processing system 110 may use a different or separate control signal for instructing the electronic system 150 to pause transmitting frame data. For example, the processing system 110 could continue to send an update of the buffer's usage using the status signal but prevent the electronic system 150 from transmitting more data by using a second control signal. Throttling the flow of frame data from the electronic system 150 may minimize the size of the buffer 915 even when arrangement and duration of display update clusters and in-frame blocking periods may change between subsequent frames.

In another embodiment, the electronic system 150 may control when to pause updating the display—i.e., when to insert an in-frame blanking period. For example, the graphics processor 905 may have the necessary logic for controlling when the processing system 110 switches between updating the display using the display driver module 910 and performing capacitance sensing using the touch driver module 920. Because in this embodiment the electronic system 150 controls the arrangement of the display update clusters and in the in-frame blanking periods, the status signal may not be needed. For example, the processor 905 may be preconfigured such that the length of time needed for the processing system 110 to update a portion of the display frame—e.g., a single display line—and the size of the buffer 915 are stored in memory. Based on this knowledge, the electronic system 150 may transmit the display frame as either a single chunk or in intermittent portions to the processing system 110 in a manner that prevents the buffer from experiencing an underflow or overflow. Moreover, to prevent visual artifacts, the logic of the graphics processor 905 may change the arrangement and/or the duration of the display update clusters and the in-frame blanking periods in the display frame. Based on the chosen technique for preventing the artifacts, the graphics processor 905 uses a control signal to pause updating the display. That is, the control signal instructs the processing system 110 to switch control of the common electrodes 935 from the display driver module 910 to the touch driver module 920.

CONCLUSION

Input devices with display screens periodically update (refresh) the screen by selectively driving common electrodes corresponding to pixels in a display line. In general, the input devices drive each electrode until each display line (and each pixel) of a display frame is updated. In addition to updating the display, the input device may perform capacitive sensing using the display screen as a proximity sensing area. To do this, the input device may interleave periods of capacitive sensing between periods of updating the display based on a display frame. For example, the input device may update the first half of display lines of the display screen, pause display updating, perform capacitive sensing, and finish updating the rest of the display lines. In this manner, the time period necessary for updating a screen based on a single display frame includes one or more interleaved periods of capacitive sensing. Further still, the input device may use common electrodes for both updating the display and performing capacitive sensing.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A processing system for a display device comprising a plurality of common electrodes, at least one of the plurality of common electrodes comprised by a plurality of sensor electrodes and configured to be driven for updating a display of the display device and capacitive sensing, during a display frame, the processing system comprising:
   a driver module comprising driver circuitry, the driver module configured to couple to the plurality of sensor electrodes, wherein the display frame comprises a plurality of display line update periods, a plurality of first blanking periods, and a plurality of second blanking periods, wherein the plurality of first blanking periods includes horizontal blanking periods occurring at the end of corresponding ones of the plurality of display line update periods and the plurality of second blanking periods includes capacitive sensing periods, wherein each of the plurality of second blanking periods occurs between respective clusters of the plurality of display line update periods, each cluster comprising at least two of the plurality of display line update periods, and wherein each of the plurality of second blanking periods is longer than each of the plurality of first blanking periods, and
   wherein the driver module is configured to drive a first sensor electrode of the plurality of sensor electrodes for capacitive sensing during a first one of the plurality of second blanking periods.

2. The processing system of claim 1, wherein the driver module, when driving the first sensor electrode for capacitive sensing, is further configured to modulate the first sensor electrode to detect a capacitive coupling between the first sensor electrode and an input object.

3. The processing system of claim 1, wherein the driver module, when driving the first sensor electrode for capacitive sensing, is further configured to drive the first sensor electrode with a transmitter signal.

4. The processing system of claim 3 further comprising:
   a receiver module coupled to a second sensor electrode of the plurality of sensor electrodes, the receiver module configured to receive resulting signals with the second sensor electrode, wherein the resulting signals comprise effects corresponding to the transmitter signal.

5. The processing system of claim 1, wherein the driver module is further configured to drive a display electrode during a first one of the first plurality of display line update periods for display updating.

6. The processing system of claim 1, wherein the display frame further comprises a third blanking period, wherein the third blanking period occurs after a last one of the plurality of display line update periods.

7. The processing system of claim 1, wherein each of the second plurality of blanking periods is at least as long as each of the plurality of display line update periods.

8. The processing system of claim 1, wherein, during the second plurality of blanking periods, display updating is paused such that no display pixel is updated.

9. The processing system of claim 1, wherein the processing system comprises:
   a determination module configured to determine positional information for an input based on resulting signals received when the first sensor electrode is driven for capacitive sensing.

10. The processing system of claim 1, wherein the first plurality of blanking periods outnumber the second plurality of blanking periods.

11. An input device comprising:
   a plurality of sensor electrodes of a display device;
   a plurality of common electrodes, at least one of the plurality of common electrodes comprised by the plurality of sensor electrodes; and a processing system coupled to the plurality of sensor and common electrodes, wherein the processing system is configured to:

drive the plurality of sensor and common electrodes for updating a display of the display device and capacitive sensing, during a display frame, wherein the display frame comprises a plurality of display line update periods, a plurality of first blanking periods, and a plurality of second blanking periods, wherein the plurality of first blanking periods includes horizontal blanking periods occurring at the end of corresponding ones of the plurality of display line update periods and the plurality of second blanking periods includes capacitive sensing periods, wherein at least a first one of the plurality of second blanking periods occurs between at least a first one of a plurality of clusters of the plurality of display line update periods, each cluster comprising at least two display line update periods of the plurality of display line update periods, and wherein each of the plurality of second blanking periods is longer than each of the plurality of first blanking periods; and drive a first sensor electrode of the plurality of sensor electrodes for capacitive sensing during a first one of the plurality of second blanking periods.

12. The input device of claim 11, wherein the processing system, when driving the first sensor electrode for capacitive sensing, is further configured to modulate the first sensor electrode to detect a capacitive coupling between the first sensor electrode and an input object.

13. The input device of claim 11, wherein the processing system, when driving the first sensor electrode for capacitive sensing, is further configured to drive the first sensor electrode with a transmitter signal, and wherein the processing system is further configured to receive resulting signals with a second sensor electrode of the plurality of sensor electrodes, and wherein the resulting signals comprise effects corresponding to the transmitter signal.

14. The input device of claim 11, wherein the processing system is further configured to drive a first one of the plurality of display electrodes during a first one of the plurality of display line update periods for display updating.

15. The input device of claim 11, wherein the display frame further comprises a third blanking period, wherein the third blanking period occurs after all the first plurality of blanking periods.

16. The input device of claim 11, wherein each of the second plurality of blanking periods is at least as long as each of the plurality of display line update periods.

17. The input device of claim 11, wherein the plurality of sensor electrodes are disposed as an array of rectangles.

18. A method for capacitive sensing, the method comprising:

providing a plurality of common electrodes, at least one of the plurality of common electrodes comprised by a plurality of sensor electrodes and configured to be driven for updating a display of a display device and capacitive sensing, during a display frame, providing a driver module, driving a first sensor electrode of the plurality of sensor electrodes that is a common electrode, with the driver module, for capacitive sensing during a first one of a plurality of second blanking periods of the display frame, wherein the display frame comprises a plurality of display line update periods, a plurality of first blanking periods and the plurality of second blanking periods, wherein the plurality of first blanking periods includes horizontal blanking periods occurring at the end of corresponding ones of the plurality of display line update periods, and the plurality of second blanking periods include capacitive sensing periods, wherein each of the plurality of second blanking periods is longer than each of the plurality of first blanking periods, and wherein each of the plurality of second blanking periods occurs between respective clusters of the plurality of display line update periods, each cluster comprising at least two of the plurality of display line update periods.

19. The method of claim 18, wherein a third blanking period of the display frame occurs after a last one of the plurality of display line update periods.

20. The method of claim 18, wherein, during the second plurality of blanking periods, display updating is paused such that no display pixel is updated.

* * * * *